United States Patent [19]

Bush et al.

[11] 4,340,318
[45] Jul. 20, 1982

[54] MECHANICAL END JOINT SYSTEM FOR STRUCTURAL COLUMN ELEMENTS

[76] Inventors: Robert A. Frosch, Administrator of the National Aeronautics and Space Administration, with respect to an invention of Harold G. Bush, Yorktown; Richard E. Wallsom, Newport News, both of Va.

[21] Appl. No.: 100,611

[22] Filed: Dec. 5, 1979

[51] Int. Cl.³ .............................. F16D 1/00; F16D 3/00
[52] U.S. Cl. ................................ 403/217; 403/317; 403/331; 403/340; 52/81
[58] Field of Search .................. 403/331, 340, 217; 52/80, 81

[56] References Cited

U.S. PATENT DOCUMENTS 2,976,968  3/1961  Fentiman .................. 403/217 X
4,131,380  12/1978  Bliquy ...................... 403/217
4,143,987  3/1979  Welsh ....................... 403/331 X
4,145,149  3/1979  Ruga ........................ 403/217

Primary Examiner—Wayne L. Shedd
Attorney, Agent, or Firm—Wallace J. Nelson; John R. Manning; Howard J. Osborn

[57] ABSTRACT

A mechanical end joint system, useful for the transverse connection of strut elements to a common node, comprises a node joint half 15 with semicircular tongue 14 and groove 60 and a strut joint half 24 with semicircular tongue 25 and groove 21. The two joint halves are engaged transversely and the connection is made secure by the inherent physical property characteristics of locking latches 12 and 26 (FIGS. 1-6) or by a spring-actioned shaft 70 (FIG. 7). A quick release mechanism (FIG. 7) provides rapid disengagement of the joint halves.

7 Claims, 7 Drawing Figures

MECHANICAL END JOINT SYSTEM FOR STRUCTURAL COLUMN ELEMENTS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to the connection of tubular strut elements to a common node or hub. It has a particularly useful application in lightweight skeletal framework structures. These structures may be used by the National Aeronautics and Space Administration in missions involving the exploitation of space.

Projects presently under consideration include such items as extremely large antenna for communications or earth surveillance, space based manufacturing facilities, and solar power stations for converting and transmitting collected solar energy to earth. These missions are characterized by structures which have large areas even by earth standards. The prospect of orbiting such structures provides unparalleled challenges for developing extremely efficient structural concepts. The success of these missions will also depend on the success of the structural designer in developing new and unique ways to fabricate and assemble large structures.

Although the Space Shuttle represents an improvement in orbital payload capability, it is also limited to an anticipated payload of sixty-five thousand pounds and a cargo bay fifteen feet in diameter and sixty feet in length. Realistically, any mission involving large structures or technology development in space in the near future must be accomplished via Space Shuttle. It is therefore advantageous to develop efficient structural concepts to minimize the total mass which must be orbited and for maximum utilization of the cargo bay area to permit weight critical payloads for Space Shuttle to be achieved and minimize the total number of flights required.

One space structure that has been considered appropriate for such missions is a three-dimensional truss network which may be in the kilometer size in two directions. Such a structural truss would be an assemblage of highly efficient compression members such as cylinders or truss columns. These compression members must also be compatible with the Shuttle packaging constraints.

A joint system in such an assemblage must produce a structurally sound joint with no axial play. Furthermore, the in-situ assembly of one of these structures could be accomplished by astronauts working in the restraining environment of outer space. The weightless environment and the restrictions of movement place severe constraints on the astronauts' ability to perform manual tasks. Consequently, the joint system must be designed to be quickly engaged, without complicated mechanical fasteners or welding, and must require a minimum of engagement force.

The assembled structure will consist of hundreds of structural columns, with each column being attached to hub joints on both ends. The stress on individual columns will be exerted in a longitudinal direction, toward the end nodes or joints. As a consequence, the assembly of the structure in space will have to be accomplished using joints which employ transverse or side engagement. The conventional longitudinal manner of making joint connections is not feasible given the operational requirements of these structures.

DESCRIPTION OF THE PRIOR ART

Previous methods of making joint connections in a framework structure have utilized mechanical fasteners, such as bolts, threaded fittings, or welding operations, and longitudinal engagement. A hub joint involving mechanical fasteners could not be engaged quickly and would entail a large number of manipulations during an in-situ assembly. Similarly, a hub joint involving mating threads would require greater precision in the initial alignment along with the application of some type of rotational force. Welding operations obviously would not be easy to accomplish given the restraints of assembly in space. Longitudinal engagement is not practical for an in-situ assembly in space and not feasible in terms of the stress placed on the hub joints.

Previous systems for joint connections also do not provide for the transmittance of tension of the extreme end of the structural columns.

Thus, a need continues to exist for a joint system for column elements in a framework structure that is easily and quickly engaged, with a minimum of force or manipulations, that exhibits no axial or longitudinal play, requires no mechanical fasteners, mating threads or welding operations, and that engages with a transverse movement.

SUMMARY OF THE INVENTION

Accordingly, it is an object of the invention to provide a joint system which can be quickly and easily engaged without mechanical fasteners, mating threads, or welding operations.

It is another object of the invention to provide a joint system that accommodates axial and rotational misalignment of node and strut.

It is another object of the invention to provide a joint system with large bearing surfaces around the joint periphery, providing for continuous bending stiffness across joint interface for strut bending in any direction.

It is a further object of the invention to provide a joint system for strut elements wherein individual columns can be inserted and removed between fixed nodes without disassembling the entire joint and other columns affixed to it.

It is still a further object of the invention to provide a joint system with engaging surfaces maximized to reduce contact stresses and deformations during loading and to increase joint solidity during vibration.

It is another object of the invention to provide a joint system with a latching mechanism perpendicular to the loading direction.

It is another object of the invention to provide a joint system wherein the joint has zero axial play.

The foregoing and further objects of the present invention are attained by providing apparatus for the connection of tubular strut elements to a common node utilizing a small force transverse to the axis of the strut elements. This joint consists of two components: a node with a plurality of outwardly extending joint halves, and a plurality of strut elements, with each of the strut elements having joint halves located on the ends thereof. Each joint half, for both the node element and the strut elements, comprises an integral semicircular tongue and groove, with locking latches and engagement steps. The tongue of a strut element mates with the groove of a joint half of the node, and vice versa. As the integral semicircular tongues enter their mating grooves, their tapered form compensates for longitudinal misalignment, and radial alignment pins compensate for radial misalignment. The mating tongues and grooves extend the load bearing capability of the joint to the center of the node. A quick release locking mechanism, instead of the locking latches is provided for the connecting elements when it is anticipated such release may be needed.

BRIEF DESCRIPTION OF THE DRAWINGS

A more complete appreciation of the present invention and many of the attendant advantages thereof will become more readily apparent as the same becomes better understood with reference to the following detailed description when taken in conjunction with the accompanying drawings, wherein.

DETAILED DESCRIPTION OF THE INVENTION

Figure 1:
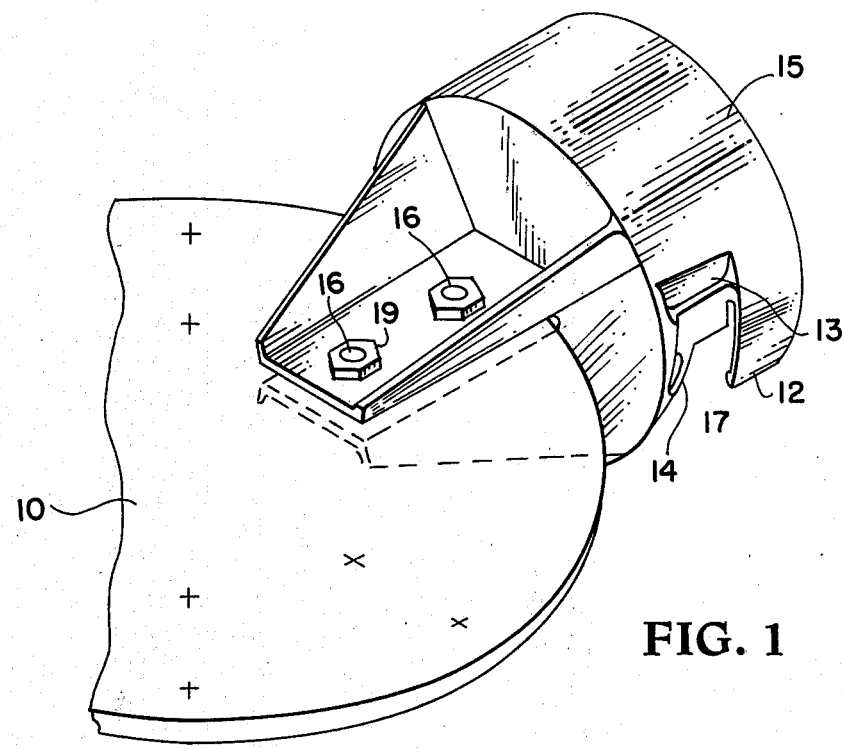
FIG. 1 illustrates the node element component of the preferred embodiment of the present invention.

Referring now to the drawings and more particularly to FIG. 1, there is shown an illustrated embodiment of the node 10 of a skeletal framework structure (shown in FIG. 5) having an attached joint half 15. In this illustration, joint half 15 is releasably or permanently attached to node 10 at suitable points 16 by mechanical fasteners 19. Only one joint half 15 is shown in the interest of clarity although it is understood that multiple such parts could be attached to node 10 in practice of the present invention. Joint half 15 is bifurcated to fit snugly onto node 10. Joint half 15 also may be constructed to be integral with node 10, as is known in the art. Integral semicircular locking latch 12 and integral semicircular tongue 14 are formed on joint half 15 so as to be positioned beyond the edge of node 10.

Figure 2:
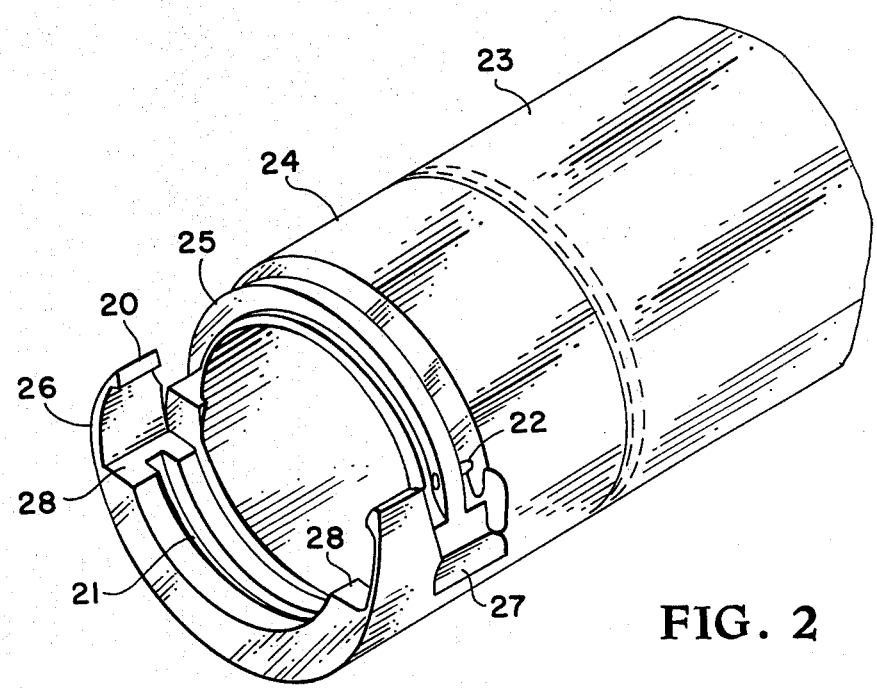
FIG. 2 illustrates the strut element component of the preferred embodiment of the invention.

Referring now to FIG. 2, there is shown the strut element component 23 of the invention having joint half 24 on the end. In this illustrated embodiment, joint half 24 is integral with strut element 23. Joint half 24 also may be threaded, bolted, riveted or otherwise releasably attached to strut element 23 as is known in the art.

In assembly, the tapered ends 20 of locking latches 26 contact the semicircular tongue 14 of joint half 15 (FIG. 1). Locking latches 26 ride the crest of tongue 14 until reaching latch engagement steps 13 (one shown in FIG. 1). Locking latches 26 are designed to act as a spring, as will be further explained hereinafter, which deflects as the latches ride the crest of tongue 14 and spring back into a locking fit upon reaching the latch engagement steps 13. Simultaneously, tapered ends 17 of locking latches 12 (one shown) of joint half 15 (FIG. 1) contact semicircular tongue 25 of joint half 24. Locking latches 12 ride the crest of tongue 25 until reaching latch engagement steps 27 (one shown), where the locking latches 12 spring back into a locking fit. At this point, tongue 25 of joint half 24 will be snug within the corresponding semicircular groove (60, FIG. 6) of joint half 15 (FIG. 1). Similarly, semicircular tongue 14 of joint half 15 will be snug within semicircular groove 21 of joint half 24. In the illustrated preferred embodiments, joint halves 15 and 24 are machined from the lightweight metal 7075-T6 aluminum. Thus, the spring action of the locking latches 12 and 26 is due to the curvature of these portions as well as the inherent physical property characteristics of the aluminum material.

When locking latches 12 and 26 approach the corresponding latch engagement steps 27 and 13, if there is improper radial alignment one side of semicircular groove shoulders 28 will contact radial alignment pins 18 (FIG. 3) of joint half 15, while one side of semicircular groove shoulders (not shown) of joint half 15 contact radial alignment pins 22 (one shown) of joint half 24. Continued application of the transverse engagement force will force the locking latches to pivot about the points of contact between the corresponding semicircular groove shoulders and the radial alignment pins. This pivoting continues until the semicircular tongues and grooves are in proper mating alignment.

Figure 3:
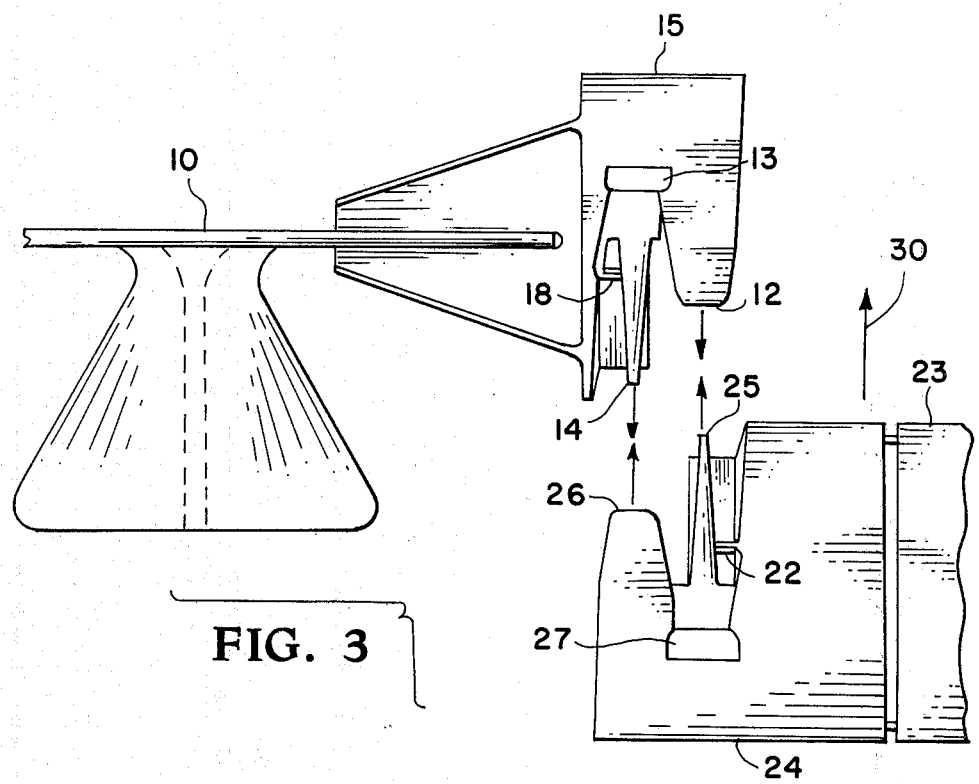
FIG. 3 illustrates the assembly operation of the preferred embodiment of the invention.

A better appreciation of the mode of operation of the invention can be achieved by reference to FIG. 3. A force transverse to the axis of strut element 23 is applied to engage the joint as shown by arrow 30. Tapered ends 17 and 20 (FIGS. 1 and 2) of locking latches 12 and 26 ride the crest of integral semicircular tongues 14 and 25. The wedge action of the engaging faces of joint halves 15 and 24 forces locking latches 12 and 26 slightly outward until locking latches 12 and 26 reach engagement steps 13 and 27. The mating of integral semicircular tongues with the corresponding integral semicircular grooves prevents longitudinal displacement. Furthermore, the mating of tongues and grooves extends the load bearing capability of the coupled joint system close to the center of node 10. This extension of the load bearing capability increases the stress limit of the joint. Radial alignment pins 18 and 22 prevent radial misalignment.

Figure 4:
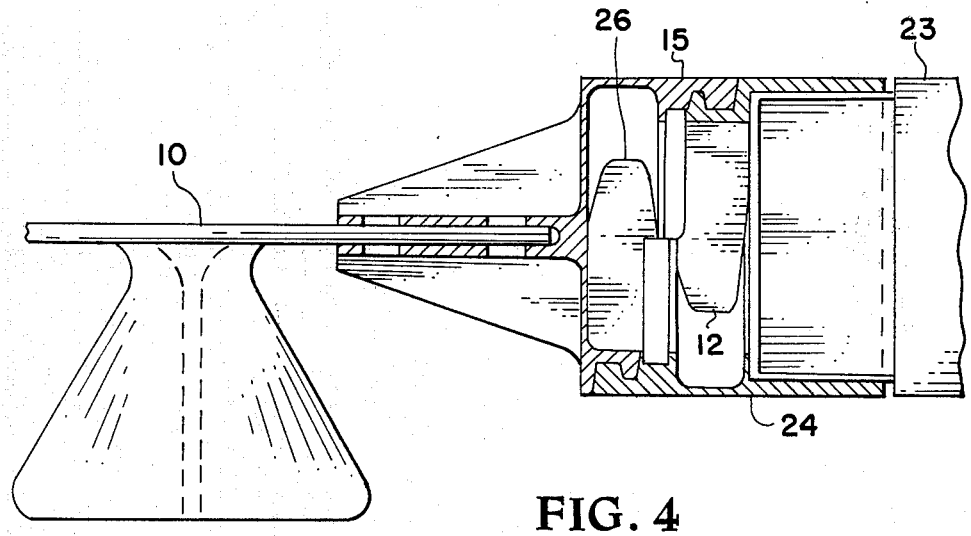
FIG. 4 illustrates the connected joint formed by the components shown in FIG. 3.
Figure 5:
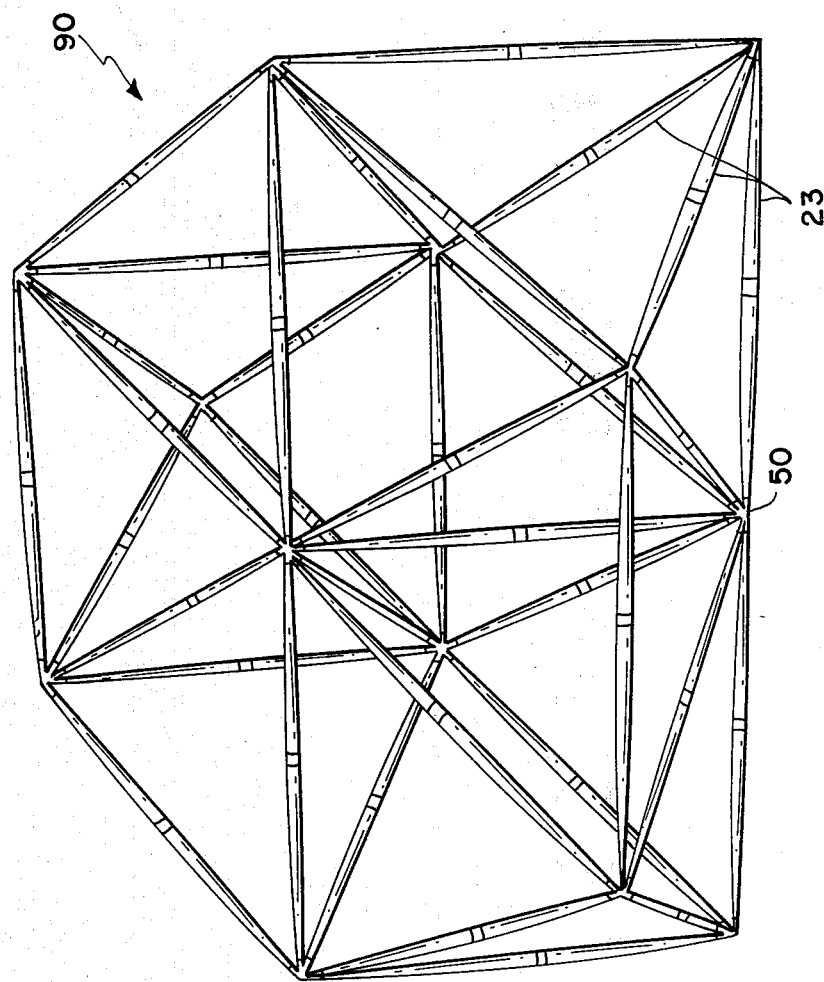
FIG. 5 illustrates an exemplary truss or framework structure formed by components assembled according to the present invention.

FIG. 4 illustrates the connected joint and FIG. 5 illustrates an exemplary section of a skeletal framework 90 structure incorporating the end joint system 50.

Figure 6:
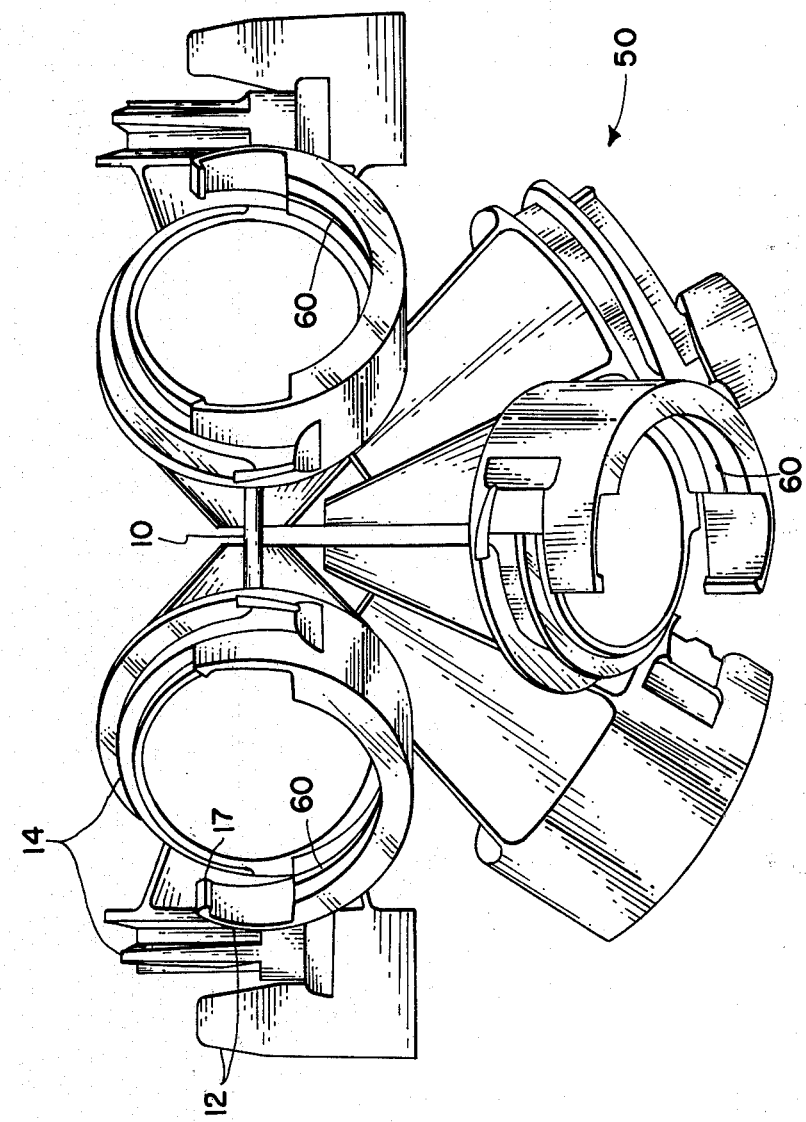
FIG. 6 illustrates a node element employed in the construction of the framework structure of FIG. 5 and employing a plurality of joint halves.

FIG. 6 illustrates the joint system 50 having a plurality of joint halves 15 integral with node 10. The joint system 50 can be molded as one piece or machined in a conventional manner.

Figure 7:
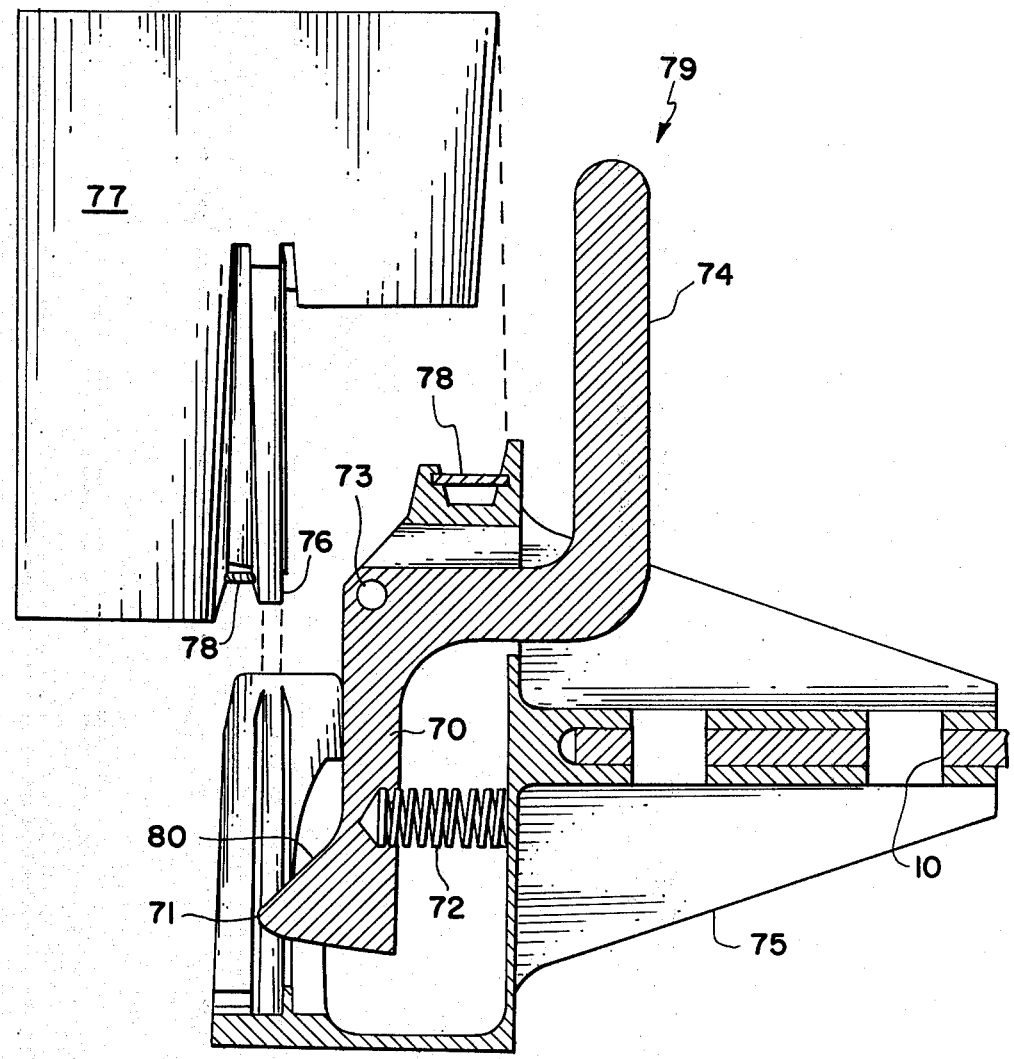
FIG. 7 is a part sectional view of a quick release locking mechanism variation of the present invention.

FIG. 7 illustrates an alternate embodiment of the invention wherein the locking mechanism consists of a shaft 70 with a broad base 71 located within node joint half 75. Spring 72 is attached to joint half 75 and locking shaft 70. Locking shaft 70 pivots about attachment point 73 and movement of lever 74 in the direction indicated by arrow 79 forces shaft 70 in the direction of node 10 and against the action of spring 72. In assembly, tongue 76 of strut element joint half 77 pushes down on cam face 80 of base 71 forcing shaft 70 against the action of spring 72. When tongue 76 of joint half 77 mates with the corresponding groove (not shown) of joint half 75, spring 72 pushes locking shaft 70 and base 71 into the hollow center area of joint half 77. Base 71 rests upon the appropriately machined inside area of joint half 77, thereby preventing further transverse movement. Radial alignment is achieved by center pins 78 which fit into corresponding perpendicular grooves (not shown) immediately forward of the semicircular grooves of each joint half. Disengagement of the assembled joint is accomplished by a movement of lever 74 in the direction of arrow 79 as shown.

Although the invention has been described relative to specific embodiments thereof, it is not so limited and many modifications and variations thereof will be readily apparent to those skilled in the art in the light of the above teachings without departing from the spirit and scope of the instant invention. For example although 7075-T6 aluminum was used for the specific embodiments described herein, any suitable material having the physical property characteristics of strength and shape retention may be employed to construct the end joints of the present invention. Also, although the invention has been described relative to connecting lightweight structural components, the end joints of the present invention may obviously be employed to connect any suitable tubular, cylindrical or other parts without departing from the invention as described and claimed herein. It is therefore to be understood that within the scope of the appended claims, the invention may be practiced otherwise than as specifically described herein.

What is claimed as new and desired to be secured by Letters Patent of the United States is:

1. A mechanical end joint system for structural column elements comprising in combination:
   (a) a node element with a plurality of first joint halves extending therefrom, each of said first joint halves comprising an integral semicircular tongue and an integral semicircular groove;
   (b) a plurality of strut elements having second joint halves on the ends thereof adapted to mate with said first joint halves, each of said second joint halves also comprising an integral semicircular tongue and an integral semicircular groove;
   (c) said integral semicircular tongue and integral semicircular groove of each of said first joint halves of said node element corresponding to said integral semicircular tongue and integral semicircular groove of each of said second joint halves of said plurality of strut elements; and
   (d) locking means and lock retention means disposed on each of said first and said second joint halves; whereby a force transverse to the axis of one of said plurality of strut elements joins said strut element to said node element by mating said integral semicircular tongue to one of said second joint halves of said strut element with said integral semicircular groove of one of said first joint halves of said node element, and by mating said integral semicircular groove of said one of said second joint halves of said strut element with said integral semicircular tongue of said one of said first joint halves of said node element, and locks said strut element to said node element by each of said locking means on one joint half serving to engage said lock retention means on the mating joint half.

2. A mechanical end joint system as in claim 1, wherein said locking means comprise integral semicircular tapered locking latches, and said lock retention means comprise latch engagement steps, whereby said integral semicircular tapered locking latches of said first joint halves extending from said node element mate with said latch engagement steps of said second joint halves on the ends of said plurality of strut elements, and whereby said integral semicircular tapered locking latches of said second joint halves on the ends of said plurality of strut elements mate with said latch engagement steps of said first joint halves extending from said node element.

3. A mechanical end joint system as in claim 2 wherein said integral semicircular tapered locking latches and latch engagement steps provide longitudinal alignment of said node element with said plurality of strut elements during mating of said first and said second joint halves.

4. A mechanical end joint system as in claim 2, wherein said latch engagement steps are recessed in the exterior surface of each of said first and said second joint halves and further including radial alignment pins positioned adjacent said recessed latch engagement steps on said first and said second joint halves, whereby said radial alignment pins provide radial alignment of said node element with said plurality of strut elements during mating of said first and said second joint halves.

5. A mechanical end joint system for structural column elements comprising:
   (a) a node joint half having an integral semicircular tongue and an integral semicircular groove;
   (b) a pivotable locking shaft attached to said node joint half, said pivotable locking shaft having a base provided with a cam face;
   (c) a spring attached to said node joint half and said pivotable locking shaft;
   (d) a strut element joint half having a hollow center area and further comprising an integral semicircular tongue and an integral semicircular groove;
   whereby assembly of the joint is accomplished by a transverse force on the strut element joint half, wherein said integral semicircular tongue of said strut element joint half pushes down on said cam face of said pivotable locking shaft forcing said pivotable locking shaft to pivot against the action of said spring thereby causing
   said integral semicircular tongue of said strut element joint half to mate with said integral semicircular groove of said node joint half;
   said integral semicircular groove of said strut element joint half to mate with said integral semicircular tongue of said node joint half; and
   said spring to push said base of said pivotable locking shaft into said hollow center area of said strut element joint half.

6. A mechanical end joint system as in claim 5 wherein a lever is attached to said pivotable locking shaft and extends above said node joint half, said pivotable locking shaft being pivotable about the point of attachment of said lever, whereby said joint system is disengaged by moving said lever to pivot said pivotable locking shaft against the action of said spring, thereby freeing said strut element joint half from said node element joint half.

7. A mechanical end joint system as in claim 5 wherein alignment pins positioned posterior to said integral semicircular tongues mate corresponding perpendicular alignment grooves positioned forward of said integral semicircular grooves.

* * * * *